(12) United States Patent
Chen et al.

(10) Patent No.: US 9,391,522 B2
(45) Date of Patent: Jul. 12, 2016

(54) RESONANT CONVERTER APPARATUS AND CONTROL METHOD FOR THE SAME

(71) Applicant: DELTA ELECTRONICS, INC., Taoyuan Hsien (TW)

(72) Inventors: Yun-Hui Chen, Taoyuan Hsien (TW); Zhi-Jiang Deng, Taoyuan Hsien (TW); Guo-Dong Yin, Taoyuan Hsien (TW); Zhong-Wei Ke, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 412 days.

(21) Appl. No.: 13/965,797

(22) Filed: Aug. 13, 2013

(65) Prior Publication Data
US 2014/0354057 A1 Dec. 4, 2014

(30) Foreign Application Priority Data
Jun. 3, 2013 (CN) .......................... 2013 1 0216905

(51) Int. Cl.
*H02J 1/00* (2006.01)
*H02J 3/00* (2006.01)
(Continued)

(52) U.S. Cl.
CPC ............ *H02M 3/285* (2013.01); *H02M 3/1584* (2013.01); *H02M 1/4225* (2013.01);
(Continued)

(58) Field of Classification Search
CPC ................. H02J 4/00; H02J 1/10; H02J 1/00; H02J 3/383; H02J 7/35; H02J 9/062; H02J 3/00; H02J 3/385; H02J 3/386; H02J 2001/008; H02J 3/16; H02J 3/32; H02J 7/34; H02J 9/06; H02J 17/00; H02J 1/04

USPC ...................................................... 307/52, 82
See application file for complete search history.

(56) References Cited

U.S. PATENT DOCUMENTS 6,583,999 B1 * 6/2003 Spindler ............... H02M 3/337
363/132
8,525,495 B2 * 9/2013 Werle .................. H02M 1/4208
323/259
(Continued)

FOREIGN PATENT DOCUMENTS

CN 101527501 A 9/2009
CN 102545596 A 7/2012
(Continued)

*Primary Examiner* — Jared Fureman
*Assistant Examiner* — Esayas Yeshaw
(74) *Attorney, Agent, or Firm* — CKC & Partners Co., Ltd.

(57) ABSTRACT

A resonant converter apparatus includes a first pre-regulator, a first resonant converter, a second pre-regulator, a second resonant converter and a controller. The first pre-regulator receives a first input voltage and generates a first output voltage. The first resonant converter receives the first output voltage and generates a supply voltage. The second pre-regulator receives a second input voltage and generates a second output voltage. The second resonant converter receives the second output voltage and generates the supply voltage, in which an output of the second resonant converter is electrically connected in parallel with an output of the first resonant converter. The controller controls the first pre-regulator and the second pre-regulator such that the first resonant converter and the second resonant converter generate identical output currents in accordance with controlled operations of the first pre-regulator and the second pre-regulator. A control method for a resonant converter apparatus is also disclosed herein.

16 Claims, 8 Drawing Sheets

(51) Int. Cl.
  *H02M 3/28* (2006.01)
  *H02M 3/158* (2006.01)
  *H02M 1/42* (2007.01)
  *H02M 1/00* (2006.01)

(52) U.S. Cl.
  CPC . *H02M2001/007* (2013.01); *H02M 2001/0058* (2013.01); *Y02B 70/126* (2013.01); *Y02B 70/1425* (2013.01); *Y02B 70/1491* (2013.01); *Y10T 307/549* (2015.04)

(56) References Cited

U.S. PATENT DOCUMENTS

| | | | | |
|---|---|---|---|---|
| 8,536,735 B2* | 9/2013 | Yan | ............... | H02M 3/3376 307/77 |
| 2002/0185982 A1* | 12/2002 | Shen | ............... | H05B 41/28 315/291 |
| 2007/0086224 A1 | 4/2007 | Phadke et al. | | |
| 2007/0159862 A1* | 7/2007 | Vinciarelli | ............ | H02M 3/157 363/65 |
| 2007/0181547 A1* | 8/2007 | Vogel | ............... | B23K 9/1081 219/130.1 |
| 2008/0316783 A1* | 12/2008 | O'Loughlin | ........ | H02M 1/4225 363/124 |
| 2009/0231887 A1 | 9/2009 | Ye et al. | | |
| 2011/0080146 A1* | 4/2011 | Li | ............... | H02M 3/285 323/237 |
| 2011/0089913 A1* | 4/2011 | Li | ............... | H02M 1/4208 323/208 |
| 2011/0267845 A1* | 11/2011 | Ye | ............... | H02M 3/33569 363/21.02 |
| 2012/0153730 A1* | 6/2012 | Barnett | ............... | H02M 3/285 307/82 |
| 2012/0294045 A1* | 11/2012 | Fornage | ............... | H02M 7/217 363/17 |
| 2014/0253056 A1* | 9/2014 | Hu | ............... | H02M 3/158 323/205 |

FOREIGN PATENT DOCUMENTS

| | | |
|---|---|---|
| TW | 200919029 A | 5/2009 |
| TW | I367623 | 7/2012 |

\* cited by examiner

RESONANT CONVERTER APPARATUS AND CONTROL METHOD FOR THE SAME

RELATED APPLICATIONS

This application claims priority to China Application Serial Number 201310216905.8, filed Jun. 3, 2013, which is herein incorporated by reference.

BACKGROUND

1. Technical Field

The present disclosure relates to a resonant converter apparatus. More particularly, the present disclosure relates to current balance in a resonant converter apparatus.

2. Description of Related Art

With advanced development of technology, more and more power applications are designed with high efficiency, high power density, low cost, etc., and thus resonant converters are widely applied. In high power applications, resonant converters are usually connected in parallel with each other and operate accordingly to deliver high output current, which has advantages for maintenance, and the reliability of the apparatus may be improved by using parallel redundancy.

FIG. 1A is a diagram illustrating a conventional resonant converter apparatus. As shown in FIG. 1A, resonant converters 12 and 14 are connected in parallel to a pre-regulator 10, and the pre-regulator 10 and the resonant converters 12 and 14 cooperate with each other to deliver high output current. However, when impedances of the resonant converters 12 and 14 are different, output currents of the resonant converters 12 and 14 are unequal. Although the output currents of the resonant converters 12 and 14 may become equal if the resonant converters 12 and 14 operate with different operating frequency, this would result in that ripples of the output currents of the resonant converters 12 and 14 cannot have a phase difference of 90°, thus causing a large ripple on current of an output filtering capacitor.

Furthermore, two or more resonant converters connected in parallel may output the same current if the symmetrical design or layout is utilized, but it is difficult to ensure a completely symmetrical layout since there are some inherent differences (e.g., different impedances) between circuits. Therefore, there is always an output current difference or unbalance between the resonant converters, which results in low efficiency and thermal loss of the apparatus and the loss for the resonant converter delivering high output current could be significant.

Therefore, a heretofore unaddressed need exists in the art to address the aforementioned deficiencies and inadequacies.

SUMMARY

An aspect of the present disclosure is related to a resonant converter apparatus. The resonant converter apparatus comprises a first pre-regulator, a first resonant converter, a second pre-regulator, a second resonant converter and a controller. The first pre-regulator is configured for receiving a first input voltage and generating a first output voltage. The first resonant converter is configured for receiving the first output voltage and generating a supply voltage. The second pre-regulator is configured for receiving a second input voltage and generating a second output voltage. The second resonant converter is configured for receiving the second output voltage and generating the supply voltage, in which an output of the second resonant converter is electrically connected in parallel with an output of the first resonant converter. The controller is configured for controlling the first pre-regulator and the second pre-regulator such that the first resonant converter and the second resonant converter generate identical output currents in accordance with controlled operations of the first pre-regulator and the second pre-regulator.

Another aspect of the present disclosure is related to a control method for a resonant converter apparatus, in which the resonant converter apparatus comprises a first pre-regulator, a second pre-regulator, a first resonant converter, and a second resonant converter electrically connected in parallel with the first resonant converter. The control method comprises: controlling the first resonant converter to generate a supply voltage and a first output current in accordance with a first output voltage of the first pre-regulator; controlling the second resonant converter to generate the supply voltage and a second output current in accordance with a second output voltage of the second pre-regulator; and in the condition of the first output current being different from the second output current, controlling the first pre-regulator and the second pre-regulator such that the first output current generated by the first resonant converter is identical to the second output current generated by the second resonant converter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

Figure 1A:
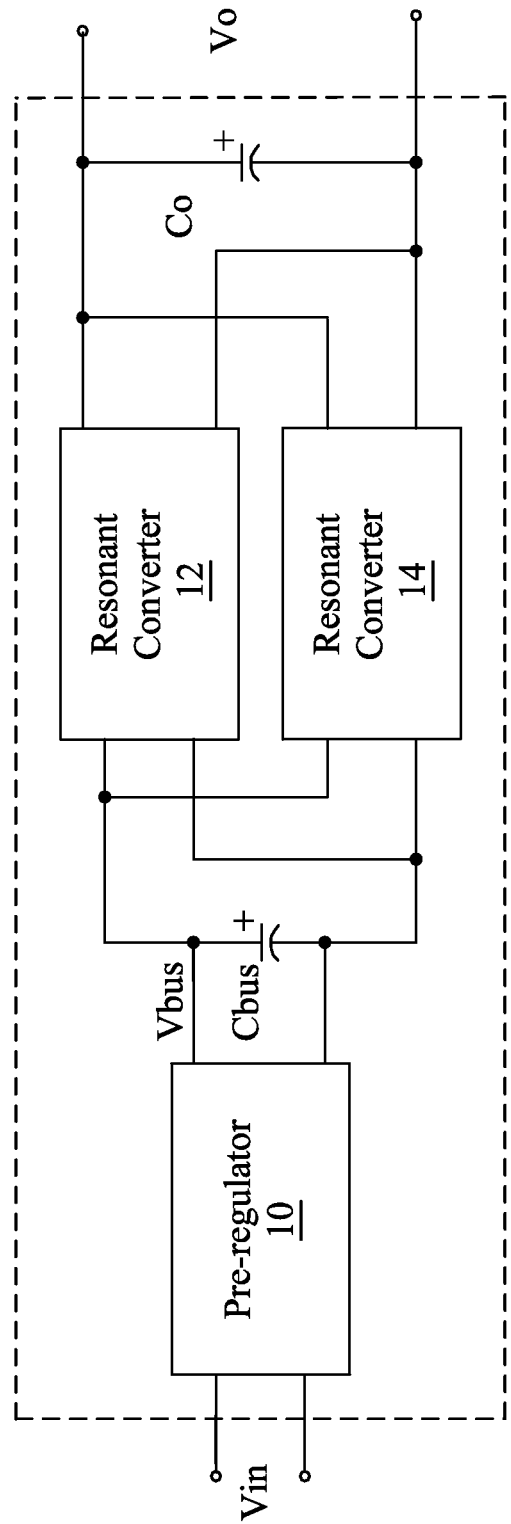
FIG. 1A is a diagram illustrating a conventional resonant converter apparatus.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples anywhere in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1B:
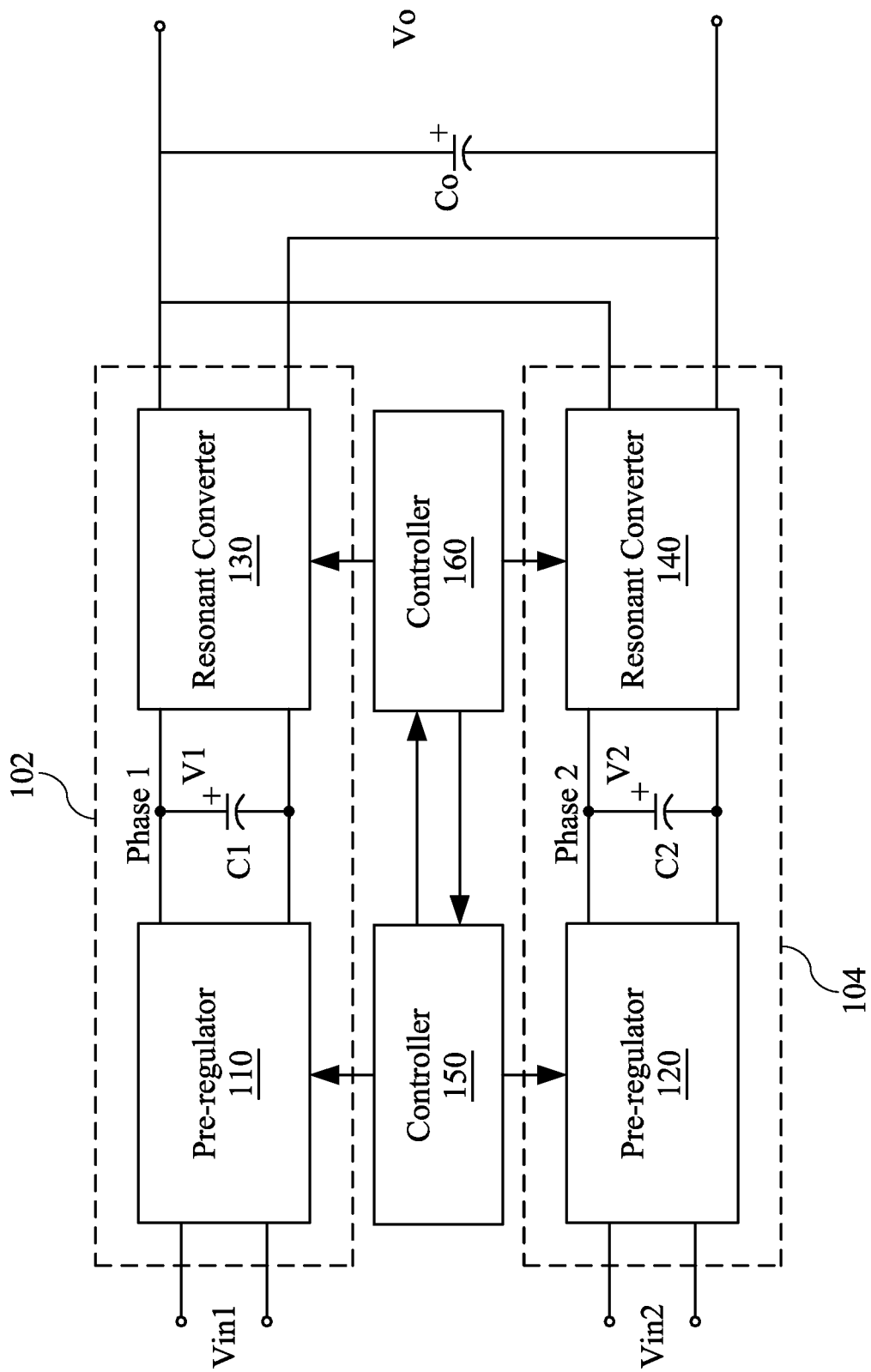
FIG. 1B is a schematic diagram of a resonant converter apparatus according to one embodiment of the present disclosure.

FIG. 1B is a schematic diagram of a resonant converter apparatus according to one embodiment of the present disclosure. As shown in FIG. 1B, the resonant converter apparatus 100 includes pre-regulators 110, 120, resonant converters 130, 140, and a controller 150. The pre-regulator 110 is configured for receiving an input voltage Vin1 and generating an output voltage V1. The resonant converter 130 is configured for receiving the output voltage V1 and generating a supply voltage Vo. The pre-regulator 120 is configured for receiving an input voltage Vin2 and generating an output voltage V2. The resonant converter 140 is configured for receiving the output voltage V2 and generating the supply voltage Vo, in which an output of the resonant converter 140 is electrically connected in parallel with an output of the resonant converter 130 and, for example, an output filtering capacitor Co. The controller 150 is configured for controlling the pre-regulator 110 and the pre-regulator 120 such that the resonant converter 130 and the resonant converter 140 generate identical output currents in accordance with controlled operations of the pre-regulator 110 and the pre-regulator 120.

Since the output currents of the resonant converter 130 and the resonant converter 140 are identical to each other, the balance of the output currents of the resonant converter 130 and the resonant converter 140 can be achieved, and thus low efficiency and thermal loss of the apparatus can be avoided, and the loss for the resonant converters 130 and 140 can be improved when they are configured for delivering high output current.

In one embodiment, at least one of the input voltage Vin1 and the input voltage Vin2 is a direct-current (DC) voltage or an alternating-current (AC) voltage. In other words, the input voltage Vin1 can be DC voltage or AC voltage, and the input voltage Vin2 can be DC voltage or AC voltage.

In another embodiment, the input voltage Vin1 provided for the pre-regulator 110 can be the same as or different from the input voltage Vin2 provided for the pre-regulator 120.

In practice, the pre-regulator 110 and/or the pre-regulator 120 can be a power factor correction (PFC) converter, a boost converter, a buck converter, etc.

In one embodiment, the resonant converter apparatus 100 may further include another controller 160, and the controller 160 is configured for controlling the resonant converter 130 and the resonant converter 140 to operatively generate the supply voltage V0 and the output currents in accordance with the output voltages V1 and V2, respectively.

In another embodiment, the resonant converter 130 and the resonant converter 140 operate with a same operating frequency and a phase difference of 90°.

Although the output current of the resonant converter 130 can be designed to be the same as the output current of the resonant converter 140 when the resonant converters 130 and 140 operate with different operating frequencies, this manner results in that the ripples of the output currents of the resonant converters 130 and 140 fail to have the required phase difference (e.g., the phase difference of 90°), and also the current ripples (or AC current value) on the output of the output filtering capacitor Co could be significant which results in large size of the output filtering capacitor Co and high power loss of the converter. Therefore, if the resonant converters 130 and 140 are required to operate with the same operating frequency such that the ripples of the output currents of the resonant converters 130 and 140 can have the required phase difference (e.g., the phase difference of 90°) and the current ripples on the output of the output filtering capacitor Co can be reduced, the controller 150 can control the pre-regulators 110 and the pre-regulator 120 such that the resonant converter 130 and the resonant converter 140 generate identical output currents in the condition of the resonant converters 130 and 140 operating with the same operating frequency.

In one embodiment, the pre-regulator 110 and the resonant converter 130 may be electrically connected with each other in one phase (Phase 1) and both disposed in a converter unit 102, and the pre-regulator 120 and the resonant converter 140 may be electrically connected with each other in the other phase (Phase 2) and both disposed in a converter unit 104, in which there may be a storage filtering capacitor C1 electrically connected between the pre-regulator 110 and the resonant converter 130 and a storage filtering capacitor C2 electrically connected between the pre-regulator 120 and the resonant converter 140. The converter unit 102 and the converter unit 104 are electrically connected in parallel with each other, in which the converter unit 102 has an input for receiving the input voltage Vin1 and an output for outputting the supply voltage Vo, and the converter unit 104 has an input for receiving the input voltage Vin2 and an output for outputting the supply voltage Vo. In practice, the input voltage Vin1 provided for the converter unit 102 can be the same as or different from the input voltage Vin2 provided for the converter unit 104; that is, persons of ordinary skill in the art can select the input voltages Vin1 and Vin2 according to practical needs.

Notably, although FIG. 1B illustrates two phases (e.g., converter units 102 and 104) which are electrically connected in parallel with each other, it is merely for purposes of easy and convenient illustration and thus the present disclosure should not be limited thereto; in other words, persons of ordinary skill in the art can utilize the aforementioned manner with more than two phases (e.g., more than two converter units).

Figure 2:
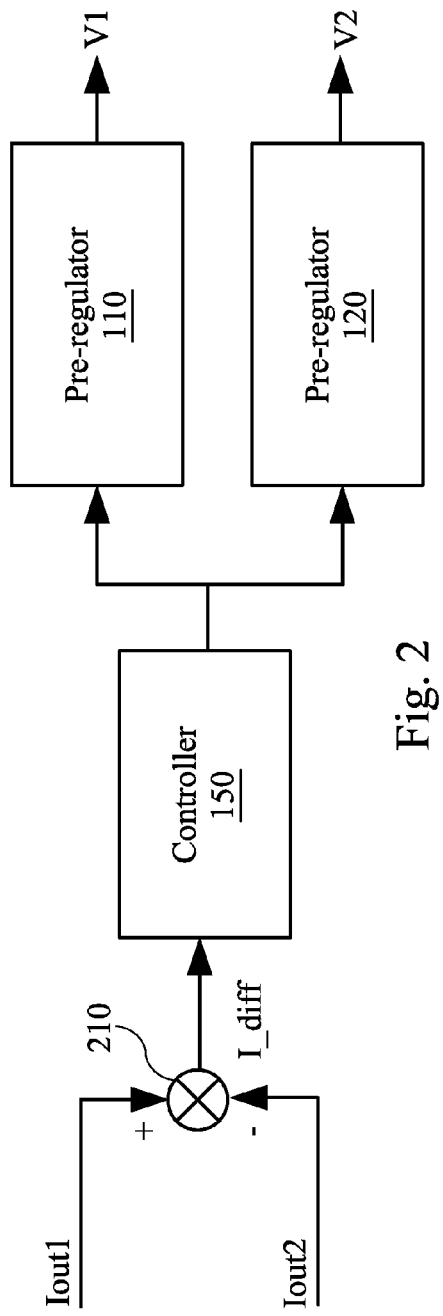
FIG. 2 is a schematic diagram illustrating a control mechanism applied in the resonant converter apparatus as shown in FIG. 1B according to one embodiment of the present disclosure.

FIG. 2 is a schematic diagram illustrating a control mechanism applied in the resonant converter apparatus as shown in FIG. 1B according to one embodiment of the present disclosure. For convenience of illustration, reference is made to both FIG. 1B and FIG. 2. As shown in FIG. 2, the controller 150 is configured for receiving a current difference I_diff and configured for controlling the pre-regulator 110 and the pre-regulator 120 in accordance with the current difference I_diff to modify the output voltages V1 and V2, respectively.

In operation, for example, in the condition of the resonant converter 130 and the resonant converter 140 operating with the same operating frequency and the phase difference of 90°, if the output voltages V1 and V2 are the same and internal impedances of the resonant converters 130 and 140 are different, the resonant converter 130 generates an output current Iout1 which is different from an output current Iout2 generated by the resonant converter 140, in which the difference between the output current Iout1 and the output current Iout2 is represented by the current difference I_diff. In that case, the controller 150 controls the pre-regulator 110 and the pre-regulator 120 in accordance with the current difference I_diff to modify the output voltages V1 and V2, respectively, such that the output voltages V1 and V2 become different from each other and thus the output current Iout1 and the output current Iout2 become identical to each other.

Moreover, in one embodiment, the resonant converter apparatus 100 shown in FIG. 1B may further include a comparison circuit 210 as illustrated in FIG. 2. The comparison circuit 210 is configured for comparing the output current Iout1 which is generated by the resonant converter 130, with the output current Iout2 which is generated by the resonant converter 140 and is different from the output current Iout1, to generate the current difference I_diff provided for the controller 150.

Figure 3:
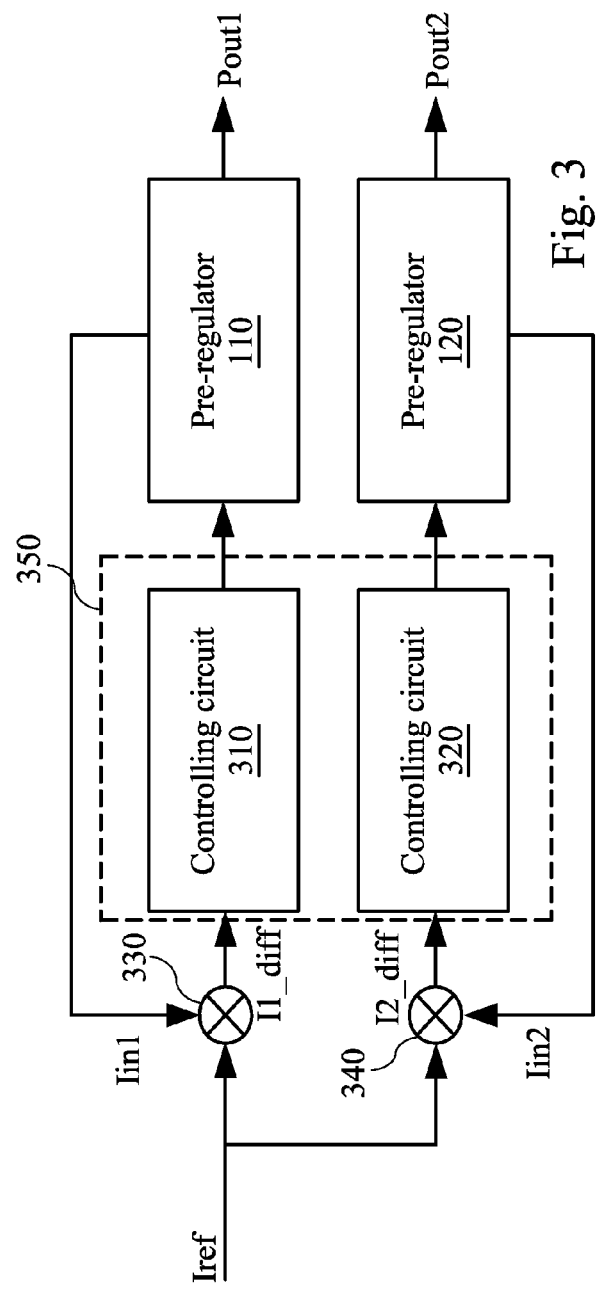
FIG. 3 is a schematic diagram illustrating a control mechanism applied in the resonant converter apparatus as shown in FIG. 1B according to another embodiment of the present disclosure.

FIG. 3 is a schematic diagram illustrating a control mechanism applied in the resonant converter apparatus according to another embodiment of the present disclosure, in which the control mechanism can be applied in the resonant converter apparatus as shown in FIG. 1B, but it is not limited thereto. For convenience of illustration, reference is made to both FIG. 1B and FIG. 3. As shown in FIG. 3, the pre-regulator 110 is controlled by a controller 350 and has an input current Iin1 and an output power Pout1, and the pre-regulator 120 is controlled by the controller 350 and has an input current Iin2 and an output power Pout2, in which the output power Pout1 is provided as the input power for the resonant converter 130 and the output power Pout2 is provided as the input power for the resonant converter 140.

Furthermore, the controller 350 may further include two controlling circuits 310 and 320, in which the controlling circuit 310 is configured for controlling the pre-regulator 110 in accordance with a first current difference I1_diff to modify the output power Pout1 of the pre-regulator 110, and the controlling circuit 320 is configured for controlling the pre-regulator 120 in accordance with a second current difference I2_diff to modify the output power Pout2 of the pre-regulator 120 such that the output power Pout2 is the same as the output power Pout1. As a result, the resonant converter 130 has an input power (i.e., the power Pout1) which is the same as an input power (i.e., the power Pout2) of the resonant converter 140. In one embodiment, the input voltages Vin1 and Vin2 respectively provided for the converter units 102 and 104 shown in FIG. 1B are identical to each other, such that the output power Pout1 and the output power Pout2 can be modified according to the manner mentioned above, and thus the output currents of the resonant converters 130 and 140 can be identical to each other.

In operation, for example, in the condition of the resonant converters 130 and 140 having the same impedances, the resonant converter 140 operates in parallel with the resonant converter 130 and the resonant converters 130 and 140 both generate the supply voltage Vo (i.e., the resonant converters 130 and 140 having the same output voltage). Since the resonant converters 130 and 140 both generate the supply voltage Vo, the output currents of the resonant converters 130 and 140 can thus be identical to each other such that the current sharing for multiple phases can be achieved.

Moreover, in one embodiment, the resonant converter apparatus 100 shown in FIG. 1B may further include comparison circuits 330 and 340 as illustrated in FIG. 3. The comparison circuit 330 is configured for comparing a reference current Iref with the input current Iin1 of the pre-regulator 110 and generating the first current difference I1_diff provided for the controlling circuit 310. The comparison circuit 340 is configured for comparing the reference current Iref with the input current Iin2 of the pre-regulator 120 and generating the second current difference I2_diff provided for the controlling circuit 320.

In another aspect, the controlling circuit 310 is configured for controlling the pre-regulator 110 in accordance with the first current difference I1_diff to modify the input current Iin1 of the pre-regulator 110, and the controlling circuit 320 is configured for controlling the pre-regulator 120 in accordance with the second current difference I2_diff to modify the input current Iin2 of the pre-regulator 120, such that the input current Iin2 of the pre-regulator 120 is the same as the input current Iin1 of the pre-regulator 110. In one embodiment, the input voltages Vin1 and Vin2 respectively provided for the converter units 102 and 104 shown in FIG. 1B are identical to each other, such that the input current Iin1 and the input current Iin2 can be modified according to the manner mentioned above, and thus the output currents of the resonant converters 130 and 140 can be identical to each other.

In operation, for example, in the condition of the resonant converters 130 and 140 having the same impedances, the controlling circuit 310 controls the pre-regulator 110 in accordance with the first current difference I1_diff and the controlling circuit 320 controls the pre-regulator 120 in accordance with the second current difference I2_diff, such that the input current Iin1 of the pre-regulator 110 is the same as the input current Iin2 of the pre-regulator 120, and the input power of the pre-regulator 110 is identical to the input power of the pre-regulator 120, and thus the pre-regulators 110 and 120 have the same output power. Since the resonant converter 140 operates in parallel with the resonant converter 130 and the resonant converters 130 and 140 both generate the supply voltage Vo (i.e., the resonant converters 130 and 140 having the same output voltage), the output currents of the resonant converters 130 and 140 can thus be identical to each other, such that the current sharing for multiple phases can be achieved.

Similarly, for the aforementioned control mechanism of controlling the input current Iin1 of the pre-regulator 110 and the input current Iin2 of the pre-regulator 120, the comparison circuit 330 can also be configured for comparing the reference current Iref with the input current Iin1 of the pre-regulator 110 and generating the first current difference I1_diff provided for the controlling circuit 310, and the comparison circuit 330 can also be configured for comparing the reference current Iref with the input current Iin2 of the pre-regulator 120 and generating the second current difference I2_diff provided for the controlling circuit 320.

Figure 4A:
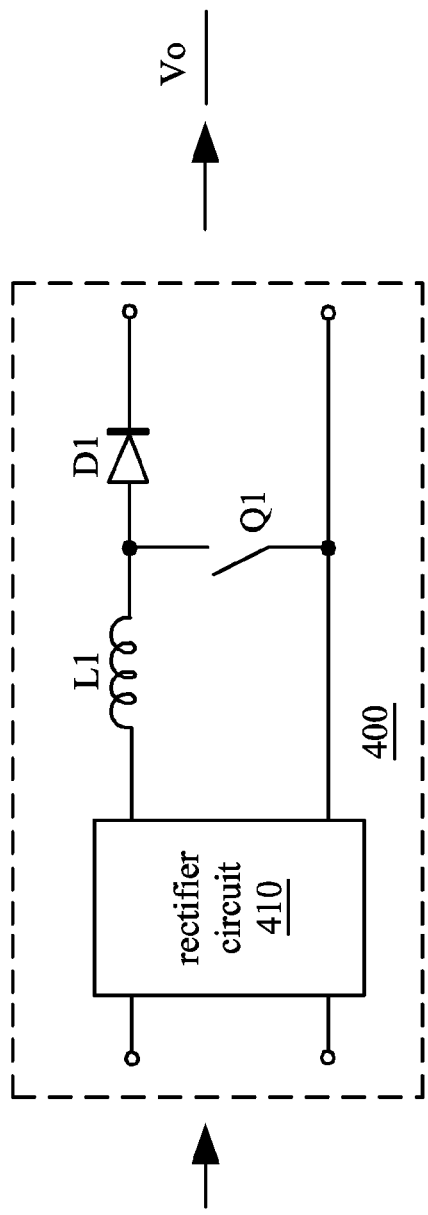
FIG. 4A is a schematic diagram illustrating a pre-regulator according to one embodiment of the present disclosure.

FIG. 4A is a schematic diagram illustrating a pre-regulator according to one embodiment of the present disclosure, in which the pre-regulator in the present embodiment can be applied in the pre-regulator 110 and/or the pre-regulator 120 as shown in FIG. 1B, but it is not limited thereto. As shown in FIG. 4A, the pre-regulator 400 includes a rectifier circuit 410, an inductor device L1, a diode device D1 and a switch device Q1. The rectifier circuit 410 is configured to receive and rectify an AC input voltage Vin. The inductor device L1 has a first terminal and a second terminal, in which the first terminal of the inductor device L1 is electrically connected to the rectifier circuit 410. The diode device D1 has an anode terminal and a cathode terminal, in which the anode terminal of the diode device D1 is electrically connected to the second terminal of the inductor device L1. The switch device Q1 has a terminal electrically connected to the second terminal of the inductor device L1 and the anode terminal of the diode device D1.

In the present embodiment, the pre-regulator 400 is configured for receiving the AC input voltage Vin and outputting a DC output voltage Vo. In practice, the pre-regulator 400 can be a power factor correction (PFC) converter, etc.

In operation, the switch device Q1 can be controlled to be alternately switched on and switched off such that the DC output voltage Vo can be converted from the AC input voltage Vin and regulated accordingly.

Figure 4B:
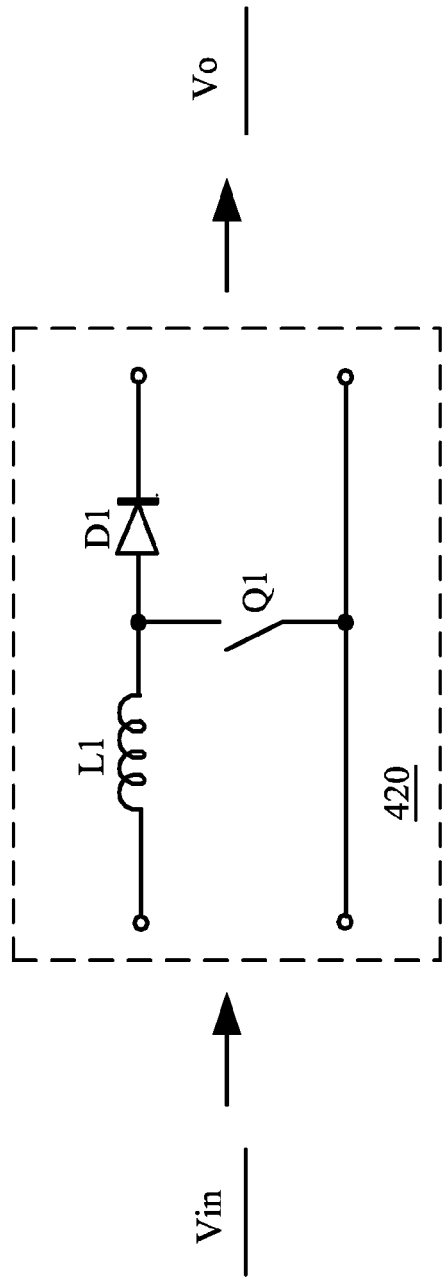
FIG. 4B is a schematic diagram illustrating a pre-regulator according to another embodiment of the present disclosure.

FIG. 4B is a schematic diagram illustrating a pre-regulator according to another embodiment of the present disclosure, in which the pre-regulator in the present embodiment also can be applied in the pre-regulator 110 and/or the pre-regulator 120 as shown in FIG. 1B, but it is not limited thereto. As shown in FIG. 4B, the pre-regulator 420 may also include the inductor device L1, the diode device D1 and the switch device Q1, and the connections of the inductor device L1, the diode device D1 and the switch device Q1 are similar to those shown in FIG. 4A, and thus they are not further detailed herein.

Compared to the embodiment shown in FIG. 4A, the pre-regulator 420 in the present embodiment is configured for receiving a DC input voltage Vin and outputting a DC output voltage Vo. In practice, the pre-regulator 400 can be a boost converter, a buck converter, etc.

Similarly, in operation, the switch device Q1 can be controlled to be alternately switched on and switched off such that the DC output voltage Vo can be converted from the DC input voltage Vin and regulated accordingly.

Figure 5:
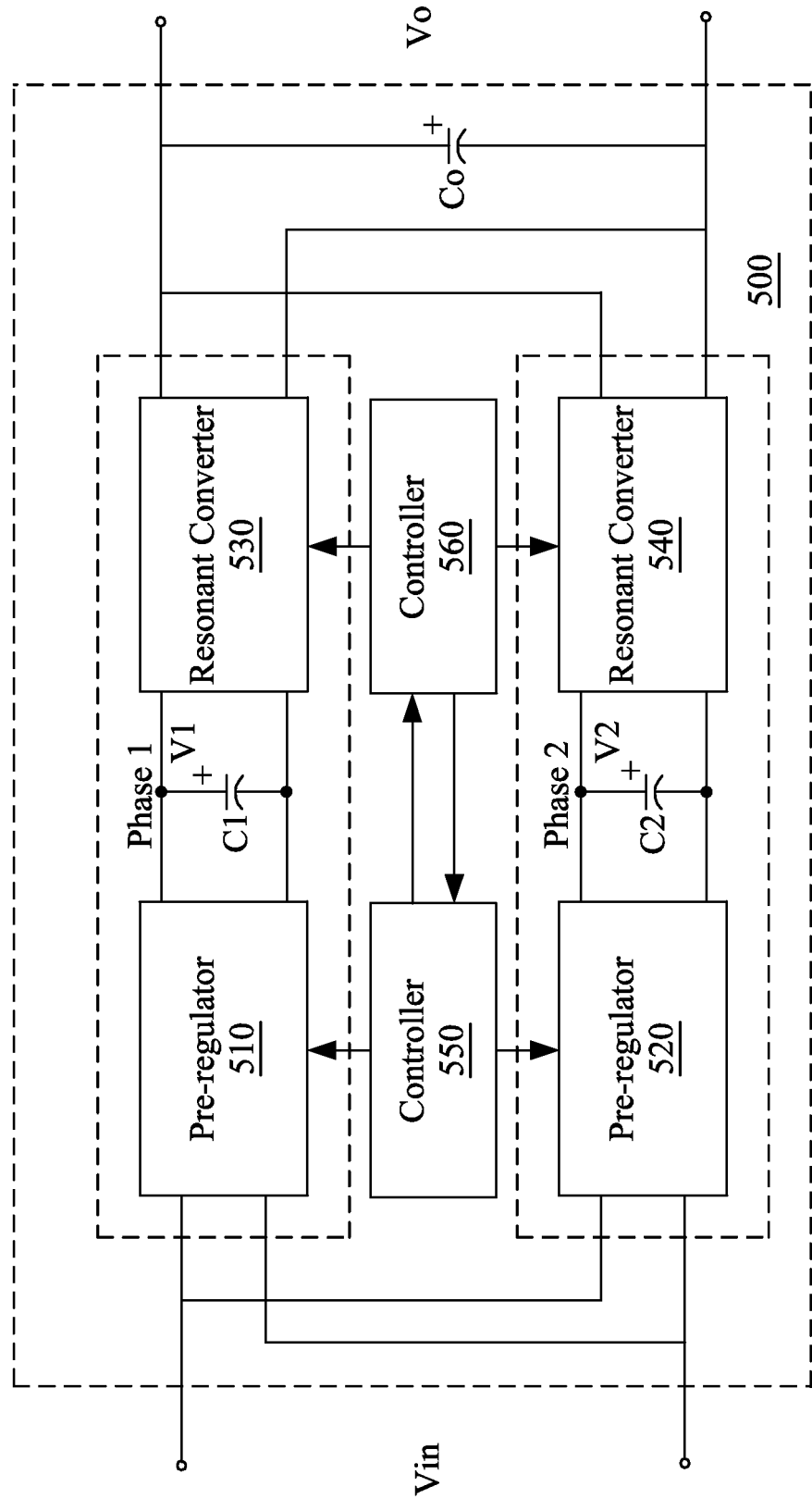
FIG. 5 is a schematic diagram of a resonant converter apparatus according to another embodiment of the present disclosure.

FIG. 5 is a schematic diagram of a resonant converter apparatus according to another embodiment of the present disclosure. As shown in FIG. 5, the resonant converter apparatus 500 includes pre-regulators 510, 520, resonant converters 530, 540, and a controller 550, and in one embodiment, the resonant converter apparatus 500 may further include another controller 560, in which the connections and operations of the pre-regulators 510, 520, the resonant converters 530, 540, and the controllers 550, 560 are similar to those described in the embodiment shown in FIG. 1B, and thus they are not further detailed herein.

Compared to FIG. 1B, the resonant converter apparatus 500 has an input for receiving the input voltage Vin and an output for outputting the supply voltage Vo, in which inputs of the pre-regulator 510 are electrically connected in parallel with inputs of the pre-regulator 520, and both of the pre-regulator 510 and the pre-regulator 520 are configured for receiving the input voltage Vin; in other words, the inputs of the pre-regulator 510 and the pre-regulator 520 are the same.

Figure 6:
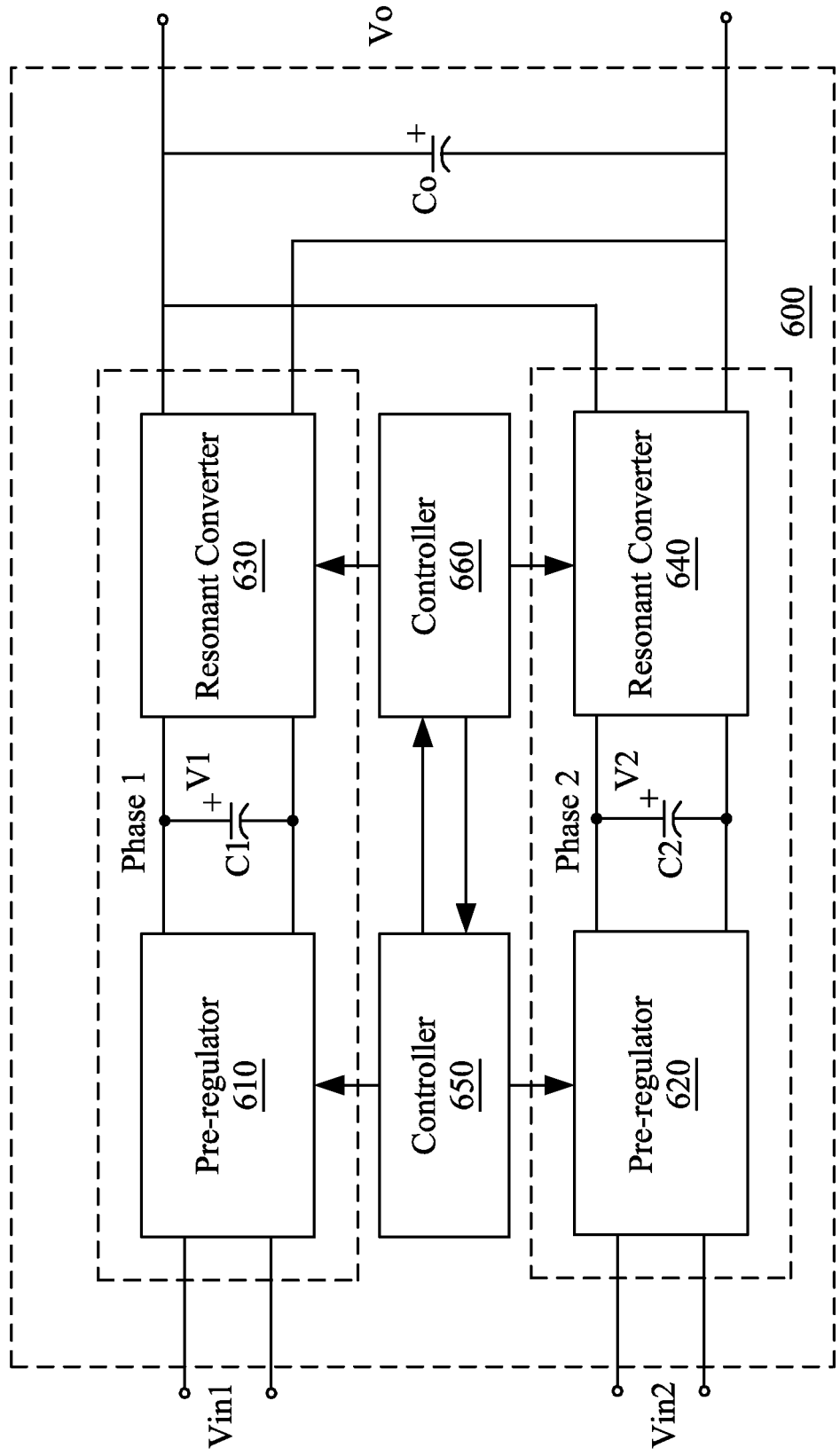
FIG. 6 is a schematic diagram of a resonant converter apparatus according to still another embodiment of the present disclosure.

FIG. 6 is a schematic diagram of a resonant converter apparatus according to still another embodiment of the present disclosure. As shown in FIG. 6, the resonant converter apparatus 600 includes pre-regulators 610, 620, resonant converters 630, 640, and a controller 650, and in one embodiment, the resonant converter apparatus 600 may further include another controller 660, in which the connections and operations of the pre-regulators 610, 620, the resonant converters 630, 640, and the controllers 650, 660 are similar to those described in the embodiment shown in FIG. 5, and thus they are not further detailed herein.

Compared to FIG. 5, the resonant converter apparatus 600 has two inputs for receiving input voltages Vin1 and Vin2, respectively, and an output for outputting the supply voltage Vo, in which inputs of the pre-regulator 610 are independent from inputs of the pre-regulator 620; in other words, the inputs of the pre-regulator 610 and the pre-regulator 620 are different from each other. On the other hand, compared to FIG. 1B, the devices shown in FIG. 6 can be integrated in the resonant converter apparatus 600 having two inputs for receiving input voltages Vin1 and Vin2.

Figure 7A:
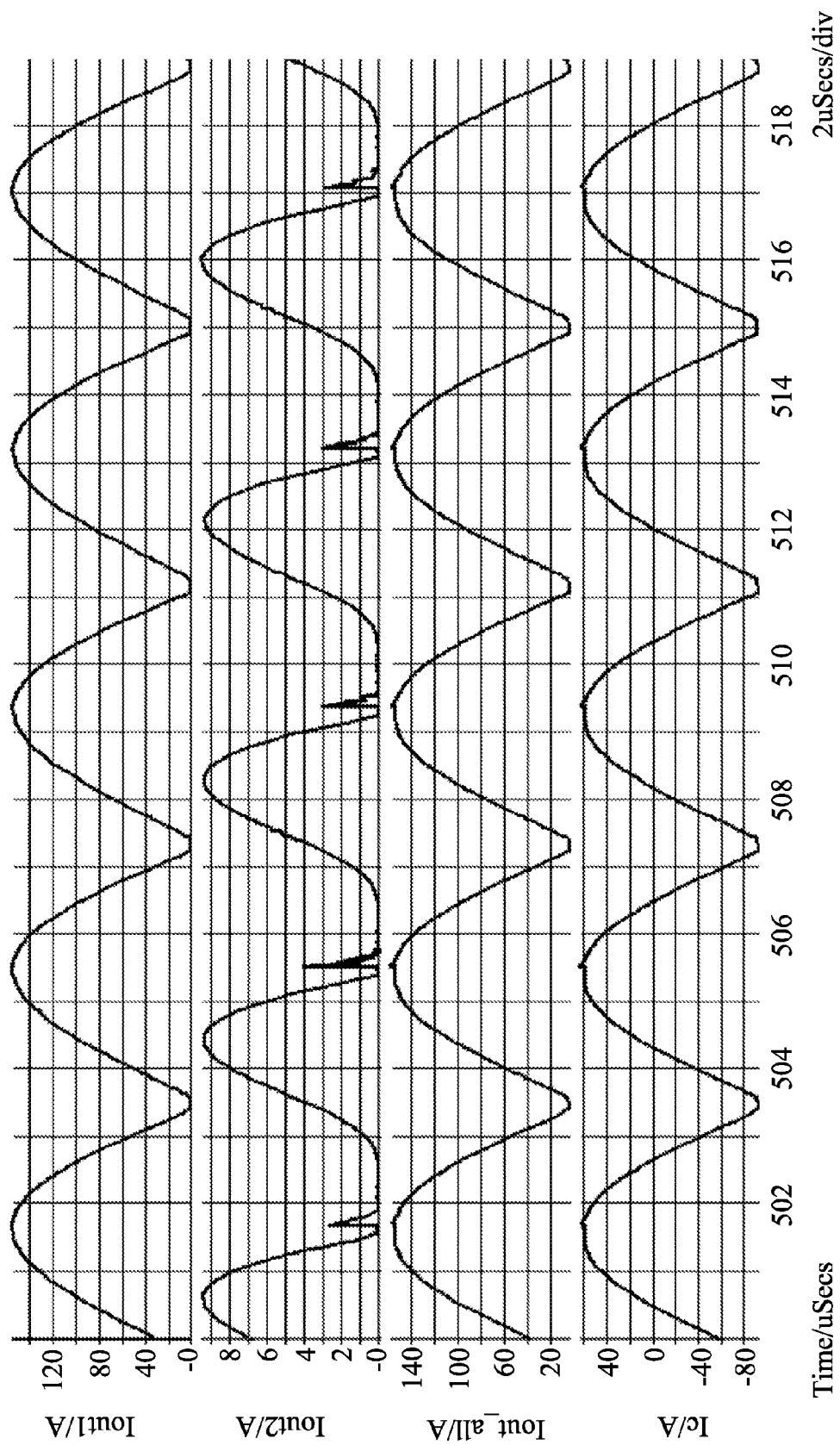
FIG. 7A is a diagram illustrating waveforms of output currents of parallel-connected resonant converters and a current on the output capacitor in a conventional resonant converter apparatus.
Figure 7B:
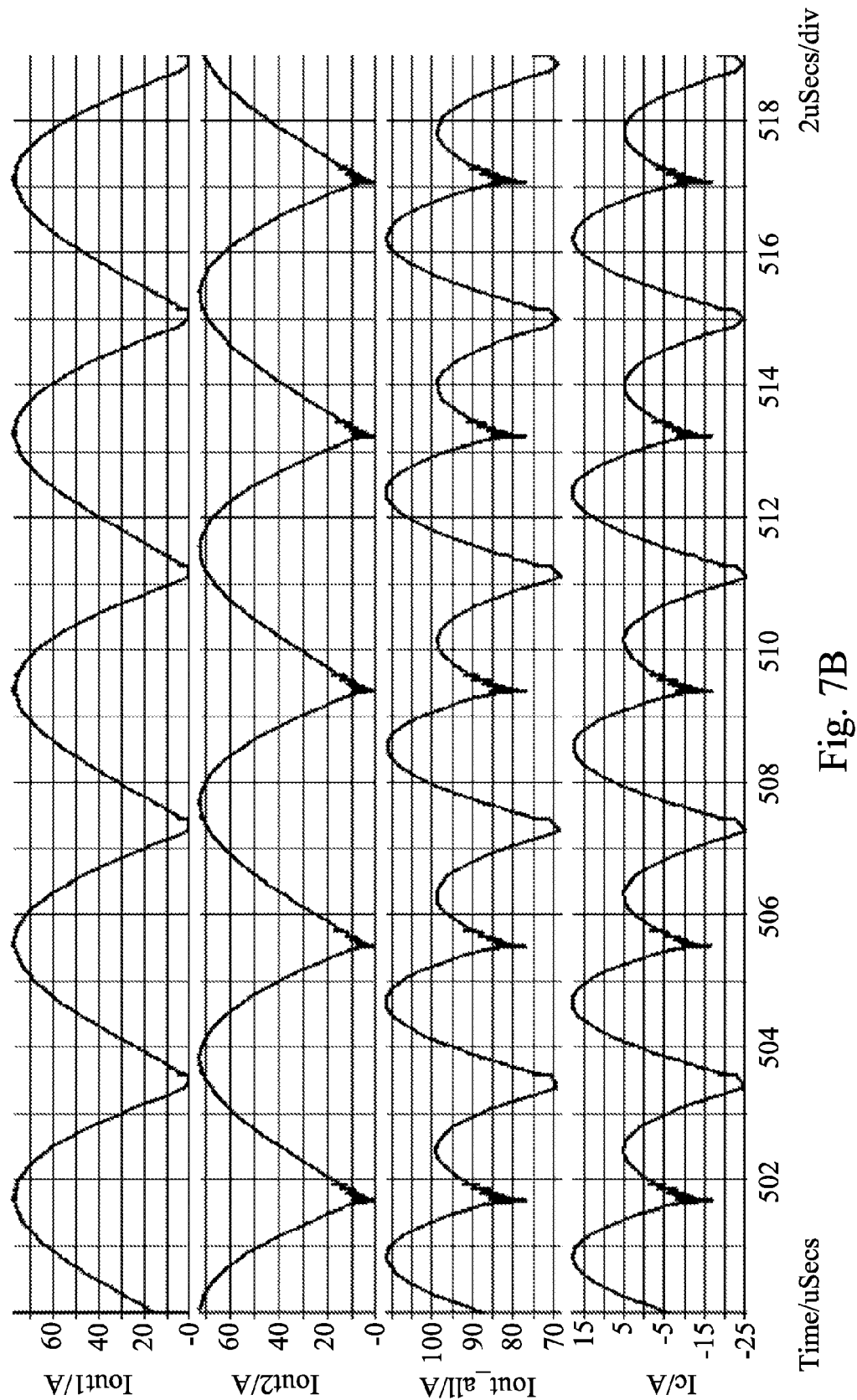
FIG. 7B is a diagram illustrating waveforms of output currents of parallel-connected resonant converters and a current on the output capacitor in the resonant converter apparatus according to one embodiment of the present disclosure.

FIG. 7A is a diagram illustrating waveforms of output currents of parallel-connected resonant converters and a current on the output capacitor in a conventional resonant converter apparatus. FIG. 7B is a diagram illustrating waveforms of output currents of parallel-connected resonant converters and a current on the output capacitor in the resonant converter apparatus according to one embodiment of the present disclosure. As shown in FIG. 7A, the peak current value of the output current Iout1 is over 140 A, the peak current value of the output current Iout2 is less than 10 A, and the peak-to-peak current value of the current Ic on the output capacitor is over 140 A. Therefore, the difference between the output currents Iout1 and Iout2 of the resonant converters is significant, and there is apparently a current unbalance.

On the other hand, as shown in FIG. 7B, the peak current value of the output current Iout1 is close to the peak current value of the output current Iout2, and the peak-to-peak current value of the current Ic on the output capacitor is less than 50 A. Therefore, the difference between the output currents Iout1 and Iout2 of the resonant converters is significantly reduced, and the current balance between the output currents of parallel-connected resonant converters is achieved.

Another aspect of the present disclosure is related to a control method for a resonant converter apparatus, in which the resonant converter apparatus can be configured as the aforementioned embodiments, but it is not limited thereto. In other words, the control method can be applied in the resonant converter apparatus of the aforementioned embodiments, but it is not limited thereto.

For purposes of convenient illustration, the control method is described below in conjunction with the embodiments shown in FIG. 1B, FIG. 2 and FIG. 3; however, it is merely exemplary and not limiting of the present disclosure.

Referring to FIG. 1B and FIG. 2, the control method includes the steps below. The resonant converter 130 is controlled to generate the supply voltage Vo and the output current Iout1 in accordance with the output voltage V1 of the pre-regulator 110. The resonant converter 140 is controlled to generate the supply voltage Vo and the output current Iout2 in accordance with the output voltage V2 of the pre-regulator 120. Moreover, in the condition of the output current Iout1 being different from the output current Iout2, the pre-regulator 110 and the pre-regulator 120 are controlled such that the output current Iout1 generated by the resonant converter 130 is identical to the output current Iout2 generated by the resonant converter 140.

In one embodiment, referring to FIG. 2, the step of controlling the pre-regulator 110 and the pre-regulator 120 may further include the step of controlling the pre-regulator 110 and the pre-regulator 120 in accordance with the current difference I_diff to modify the output voltage V1 and the output voltage V2. In addition, the control method may further include the step of comparing the output current Iout1 with the output current Iout2 to generate the current difference I_diff.

In another embodiment, referring to FIG. 3, the step of controlling the pre-regulator 110 and the pre-regulator 120 may further include the step of controlling the pre-regulator 110 in accordance with the first current difference I1_diff to modify the output power Pout1 of the pre-regulator 110 and the step of controlling the pre-regulator 120 in accordance with the second current difference I2_diff to modify the output power Pout2 of the pre-regulator 120 such that the output power Pout2 is the same as the output power Pout1. In one embodiment, the input voltages Vin1 and Vin2 respectively provided for the converter units 102 and 104 shown in FIG. 1B are identical to each other, such that the output power Pout1 and the output power Pout2 can be modified according to the manner mentioned above and thus the output currents of the resonant converters 130 and 140 can be identical to each other. In addition, the control method may further include the step of comparing the reference current Iref with the input current Iin1 of the pre-regulator 110 to generate the first current difference I1_diff and the step of comparing the reference current Iref with the input current Iin2 of the pre-regulator 120 to generate the second current difference I2_diff.

In still another embodiment, referring to FIG. 3, the step of controlling the pre-regulator 110 and the pre-regulator 120 may further include the step of controlling the pre-regulator 110 in accordance with the first current difference I1_diff to modify the input current Iin1 of the pre-regulator 110 and the step of controlling the pre-regulator 120 in accordance with the second current difference I2_diff to modify the input current Iin2 of the pre-regulator 120 such that the input current Iin2 of the pre-regulator 120 is the same as the input current Iin1 of the pre-regulator 110. In addition, the control method may further include the step of comparing the reference current Iref with the input current Iin1 of the pre-regulator 110 to generate the first current difference I1_diff and the step of comparing the reference current Iref with the input current Iin2 of the pre-regulator 120 to generate the second current difference I2_diff. In one embodiment, the input voltages Vin1 and Vin2 respectively provided for the converter units 102 and 104 shown in FIG. 1B are identical to each other, such that the input current Iin1 and the input current Iin2 can be modified according to the manner mentioned above and thus the output currents of the resonant converters 130 and 140 can be identical to each other.

The steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A resonant converter apparatus, comprising:
a first pre-regulator configured for receiving a first input voltage and generating a first output voltage;
a first resonant converter configured for receiving the first output voltage and generating a supply voltage;
a second pre-regulator configured for receiving a second input voltage and generating a second output voltage;
a second resonant converter configured for receiving the second output voltage and generating the supply voltage, wherein an output of the second resonant converter is electrically connected in parallel with an output of the first resonant converter; and
a controller configured for receiving a first current difference and a second current difference and controlling the first pre-regulator and the second pre-regulator according to the first current difference and the second current difference such that the first resonant converter and the second resonant converter generate identical output currents in accordance with controlled operations of the first pre-regulator and the second pre-regulator,
wherein the first current difference is a first difference between a first input current of the first pre-regulator and a reference current, and the second current difference is a second difference between a second input current of the second pre-regulator and the reference current.

2. The resonant converter apparatus as claimed in claim 1, wherein inputs of the first pre-regulator are independent from inputs of the second pre-regulator.

3. The resonant converter apparatus as claimed in claim 1, wherein inputs of the first pre-regulator are electrically connected in parallel with inputs of the second pre-regulator.

4. The resonant converter apparatus as claimed in claim 1, wherein the first input voltage provided for the first pre-regulator is the same as or different from the second input voltage provided for the second pre-regulator.

5. The resonant converter apparatus as claimed in claim 1, wherein the controller further comprises:
a first controlling circuit configured for controlling the first pre-regulator in accordance with the first current difference to modify a first output power of the first pre-regulator; and
a second controlling circuit configured for controlling the second pre-regulator in accordance with the second current difference to modify a second output power of the second pre-regulator such that the second output power is the same as the first output power.

6. The resonant converter apparatus as claimed in claim 5, further comprising:
a first comparison circuit configured for comparing the reference current with the first input current of the first pre-regulator and generating the first current difference; and
a second comparison circuit configured for comparing the reference current with the second input current of the second pre-regulator and generating the second current difference.

7. The resonant converter apparatus as claimed in claim 1, wherein the controller further comprises:
a first controlling circuit configured for controlling the first pre-regulator in accordance with the first current difference to modify the first input current of the first pre-regulator; and
a second controlling circuit configured for controlling the second pre-regulator in accordance with the second current difference to modify the second input current of the second pre-regulator such that the second input current of the second pre-regulator is the same as the first input current of the first pre-regulator.

8. The resonant converter apparatus as claimed in claim 7, further comprising:
a first comparison circuit configured for comparing the reference current with the first input current of the first pre-regulator and generating the first current difference; and
a second comparison circuit configured for comparing the reference current with the second input current of the second pre-regulator and generating the second current difference.

9. The resonant converter apparatus as claimed in claim 1, wherein at least one of the first pre-regulator and the second pre-regulator further comprises:
an inductor device having a first terminal and a second terminal;
a diode device having a first terminal and a second terminal, the first terminal of the diode device electrically connected to the second terminal of the inductor device; and
a switch device having a terminal electrically connected to the second terminal of the inductor device and the first terminal of the diode device.

10. The resonant converter apparatus as claimed in claim 1, wherein at least one of the first input voltage and the second input voltage is a direct-current voltage or an alternating-current voltage.

11. The resonant converter apparatus as claimed in claim 1, wherein the first resonant converter and the second resonant converter operate with a same operating frequency and a phase difference of 90°.

12. A control method for a resonant converter apparatus, the resonant converter apparatus comprising a first pre-regulator, a second pre-regulator, a first resonant converter, and a second resonant converter electrically connected in parallel with the first resonant converter, the method comprising:
controlling the first resonant converter to generate a supply voltage and a first output current in accordance with a first output voltage of the first pre-regulator;
controlling the second resonant converter to generate the supply voltage and a second output current in accordance with a second output voltage of the second pre-regulator; and
in the condition of the first output current being different from the second output current, receiving a first current difference and a second current difference and controlling the first pre-regulator and the second pre-regulator according to the first current difference and the second current difference such that the first output current generated by the first resonant converter is identical to the second output current generated by the second resonant converter, wherein the first current difference is a first difference between a first input current of the first pre-regulator and a reference current, and the second current difference is a second difference between a second input current of the second pre-regulator and the reference current.

13. The method as claimed in claim 12, wherein the step of controlling the first pre-regulator and the second pre-regulator further comprises:
controlling the first pre-regulator in accordance with the first current difference to modify a first output power of the first pre-regulator; and
controlling the second pre-regulator in accordance with the second current difference to modify a second output power of the second pre-regulator such that the second output power is the same as the first output power.

14. The method as claimed in claim 13, further comprising:
comparing the reference current with the first input current of the first pre-regulator to generate the first current difference; and
comparing the reference current with the second input current of the second pre-regulator to generate the second current difference.

15. The method as claimed in claim 12, wherein the step of controlling the first pre-regulator and the second pre-regulator further comprises:
controlling the first pre-regulator in accordance with the first current difference to modify the first input current of the first pre-regulator; and
controlling the second pre-regulator in accordance with the second current difference to modify the second input current of the second pre-regulator such that the second input current of the second pre-regulator is the same as the first input current of the first pre-regulator.

16. The method as claimed in claim 15, further comprising:
comparing the reference current with the first input current of the first pre-regulator to generate the first current difference; and
comparing the reference current with the second input current of the second pre-regulator to generate the second current difference.

* * * * *